US010331427B2

United States Patent
Lee et al.

(10) Patent No.: US 10,331,427 B2
(45) Date of Patent: *Jun. 25, 2019

(54) CAPTURING AND DEPLOYING AN OPERATION SYSTEM IN A COMPUTER ENVIRONMENT

(71) Applicant: Hewlett-Packard Development Company, L.P., Houston, TX (US)

(72) Inventors: Sam J. Lee, Round Rock, TX (US); Shehzaad B. Bidiwala, Austin, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 68 days.

This patent is subject to a terminal disclaimer.

(21) Appl. No.: 15/353,962

(22) Filed: Nov. 17, 2016

(65) Prior Publication Data

US 2017/0068529 A1 Mar. 9, 2017

Related U.S. Application Data

(63) Continuation of application No. 11/790,672, filed on Apr. 26, 2007, now Pat. No. 9,513,892.

(60) Provisional application No. 60/897,779, filed on Jan. 25, 2007.

(51) Int. Cl.
*G06F 8/61* (2018.01)
*H04L 29/08* (2006.01)

(52) U.S. Cl.
CPC ............... *G06F 8/63* (2013.01); *H04L 67/34* (2013.01)

(58) Field of Classification Search
CPC .................................. G06F 8/63; H04L 67/34
See application file for complete search history.

(56) References Cited

U.S. PATENT DOCUMENTS

| | | | |
|---|---|---|---|
| 5,481,714 A * | 1/1996 | Pipkin ..................... | G06F 8/61 717/175 |
| 5,671,420 A | 9/1997 | Bell et al. | |
| 6,253,300 B1 | 6/2001 | Lawrence et al. | |
| 6,557,169 B1 * | 4/2003 | Erpeldinger ............. | G06F 8/65 717/173 |
| 6,658,435 B1 * | 12/2003 | McCall .................... | G06F 8/63 707/650 |
| 6,938,250 B2 | 8/2005 | Cohen et al. | |
| 7,000,231 B1 * | 2/2006 | Gold ........................ | G06F 8/63 711/173 |

(Continued)

OTHER PUBLICATIONS

Bill Stackpole et al, "Decentralized virtualization in systems administration education," Rochester Institute of Technology, 2008, Accessed from http://scholarworks.rit.edu/other/769, 6 pages.

(Continued)

*Primary Examiner* — Ziaul A Chowdhury
(74) *Attorney, Agent, or Firm* — HPI Patent Department

(57) ABSTRACT

Techniques for capturing and deploying the operating system of a computing device are disclosed. An example method includes creating a file that contains settings of an operating system of a source computer and storing the file in storage on the source computer. The method also includes copying an image of the operating system and the file containing the settings of the operating system and deploying the image to one or more target computers.

13 Claims, 7 Drawing Sheets

(56) References Cited

U.S. PATENT DOCUMENTS

| | | | |
|---|---|---|---|
| 7,051,097 B1* | 5/2006 | Pecina | H04L 67/34 707/999.104 |
| 7,200,632 B1* | 4/2007 | Greschler | H04L 67/34 709/203 |
| 7,308,584 B2* | 12/2007 | Himmel | G06F 21/32 713/193 |
| 7,343,560 B1 | 3/2008 | Tanner et al. | |
| 7,512,833 B1* | 3/2009 | Murphy | G06F 8/63 714/6.1 |
| 7,644,140 B2 | 1/2010 | Lee et al. | |
| 7,664,984 B2* | 2/2010 | Wang | G06F 11/1417 714/15 |
| 2002/0004824 A1* | 1/2002 | Cuan | H04L 67/34 709/208 |
| 2002/0166067 A1 | 11/2002 | Pritchard et al. | |
| 2003/0101242 A1* | 5/2003 | Cowden | G06Q 30/0247 709/220 |
| 2003/0220983 A1 | 11/2003 | Hui | |
| 2003/0233646 A1 | 12/2003 | Cohen et al. | |
| 2004/0073552 A1 | 4/2004 | Bailey et al. | |
| 2004/0073783 A1 | 4/2004 | Ritchie | |
| 2004/0083355 A1 | 4/2004 | Smith et al. | |
| 2004/0117338 A1* | 6/2004 | Kennedy | G06F 8/63 |
| 2004/0187104 A1 | 9/2004 | Sardesai et al. | |
| 2004/0243997 A1 | 12/2004 | Mullen et al. | |
| 2005/0038932 A1* | 2/2005 | Himmel | G06F 9/4406 710/15 |
| 2005/0091346 A1* | 4/2005 | Krishnaswami | G06F 9/44505 709/220 |
| 2005/0289382 A1 | 12/2005 | Lee | |
| 2005/0289537 A1 | 12/2005 | Lee | |
| 2006/0005016 A1 | 1/2006 | Lee et al. | |
| 2006/0026587 A1 | 2/2006 | Lemarroy et al. | |
| 2006/0047797 A1 | 3/2006 | Brown et al. | |
| 2006/0075284 A1 | 4/2006 | Skan | |
| 2006/0089979 A1 | 4/2006 | Lee et al. | |
| 2006/0248328 A1 | 11/2006 | Iszlai et al. | |
| 2006/0259964 A1* | 11/2006 | Maldonado | G06F 21/604 726/16 |
| 2007/0006205 A1* | 1/2007 | Kennedy | G06F 8/63 717/168 |
| 2007/0011674 A1 | 1/2007 | Joo et al. | |
| 2007/0027933 A1* | 2/2007 | Lavin | G06F 11/1417 |
| 2007/0028230 A1 | 2/2007 | Goetz et al. | |
| 2007/0046791 A1 | 3/2007 | Wang et al. | |
| 2007/0083610 A1 | 4/2007 | Treder et al. | |
| 2007/0220121 A1 | 9/2007 | Suwarna | |
| 2008/0066051 A1* | 3/2008 | Stubbs | G06F 8/20 717/107 |
| 2008/0091929 A1* | 4/2008 | Oberhaus | G06F 9/4416 713/1 |

OTHER PUBLICATIONS

Evangelos Kotsovinos et al, "Global-scale Service Deployment in the XenoServer Platform," 2004, pp. 1-6, [Retrieved from Internet on Aug. 4, 2016], http://static.usenix.org/event/worlds04/techfull_papers/kotsovinos/kotsovinos.pdf.

Hongzhou Liu, et al, "Design and Implementation of a Single System Image Operating System for AD Hoc Network," 2005, 14 Pages.

John Zhang, et al. "A Modeling Perspective of Image-Based Installation", [Online], "Dell White Paper", Mar. 2002, pp. 2-14, [Retrieved from Internet on Aug. 14, 2012], <http://www.dell.com/downloads/global/solutions/imagebased.doc>.

Stefano Bertozzi et al, "Supporting Task Migration in Multi-Processor Systems-on-Chip: A Feasibility Study," 2016, 6 Pages.

Wiktionary, "Definition of Dismount" [Online], pp. 1-2, [Retrieved from Internet on Dec. 9, 2013], <http://en.wiktionary.org/w/index.php?title=dismount>, 2 Pages.

* cited by examiner

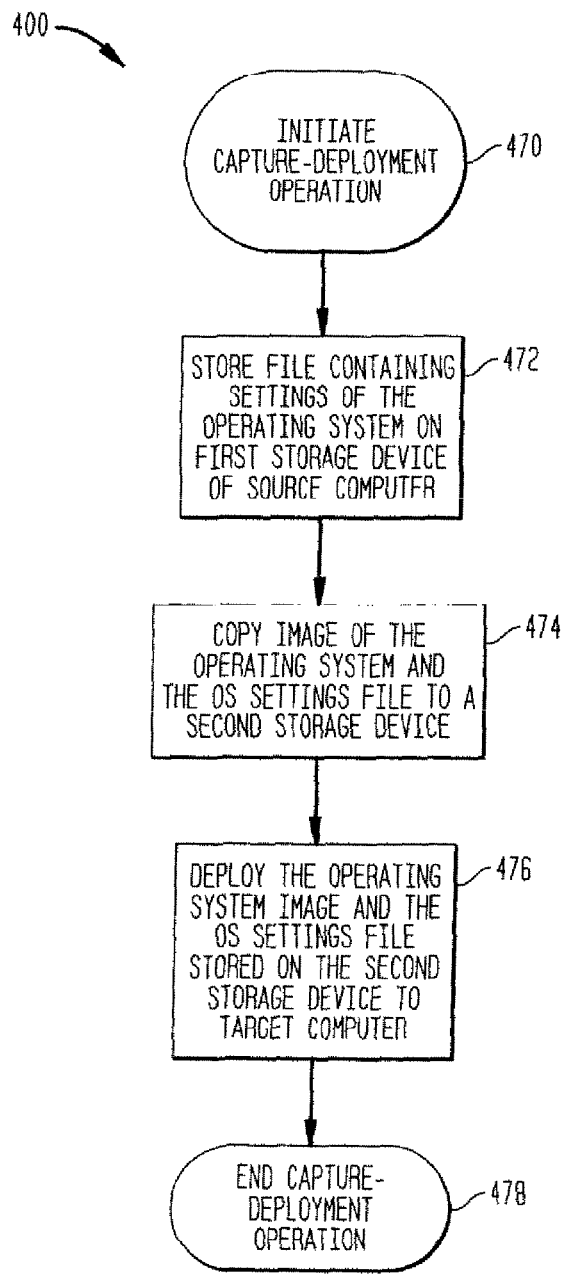

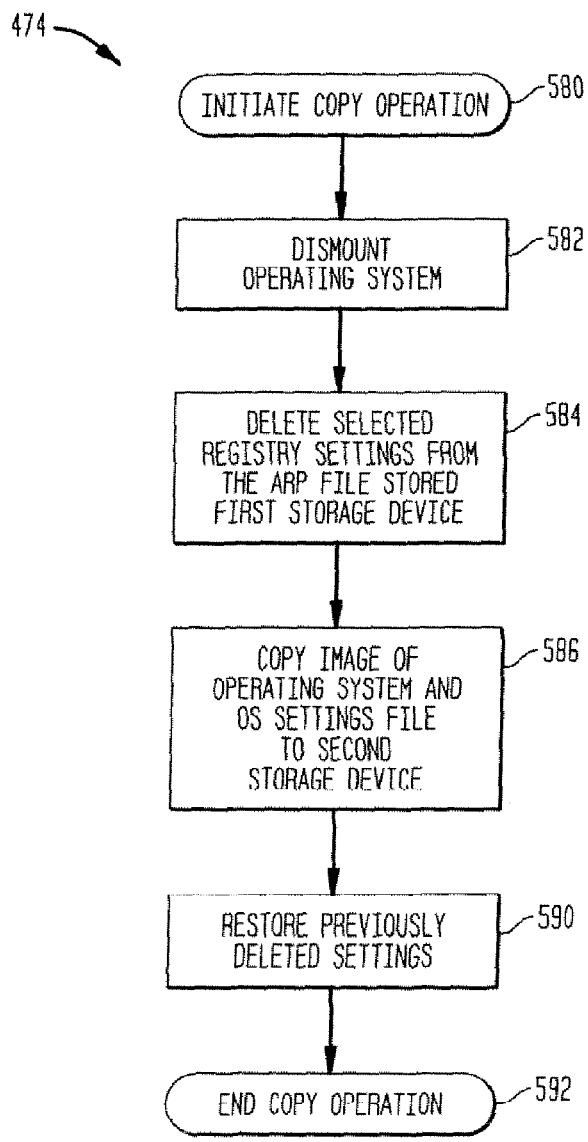

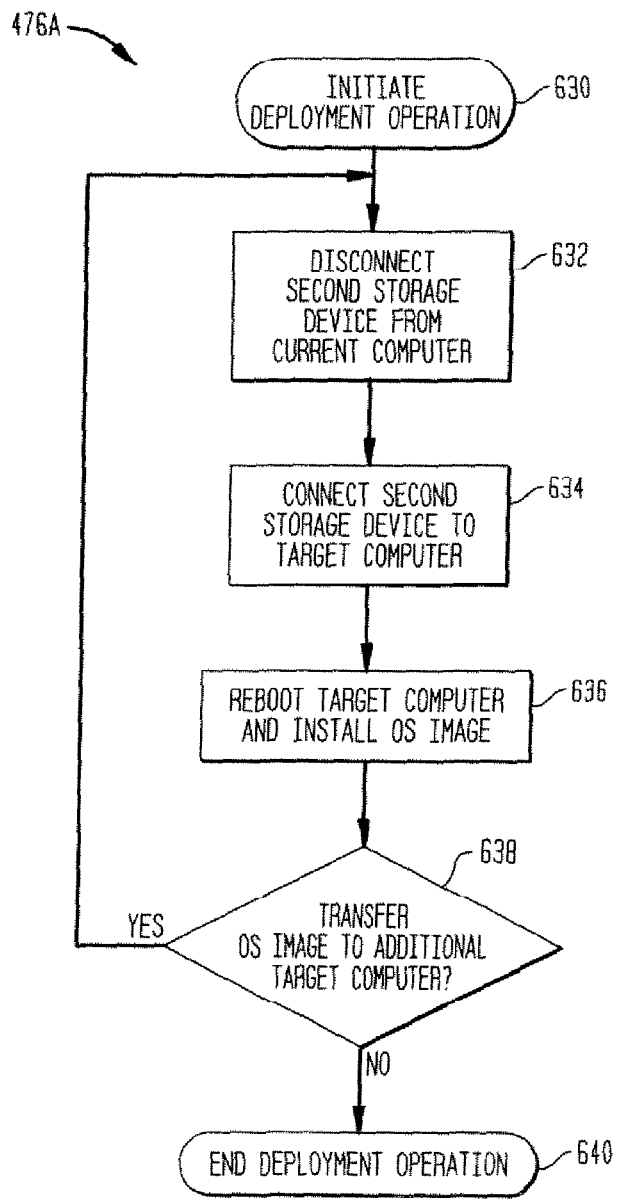

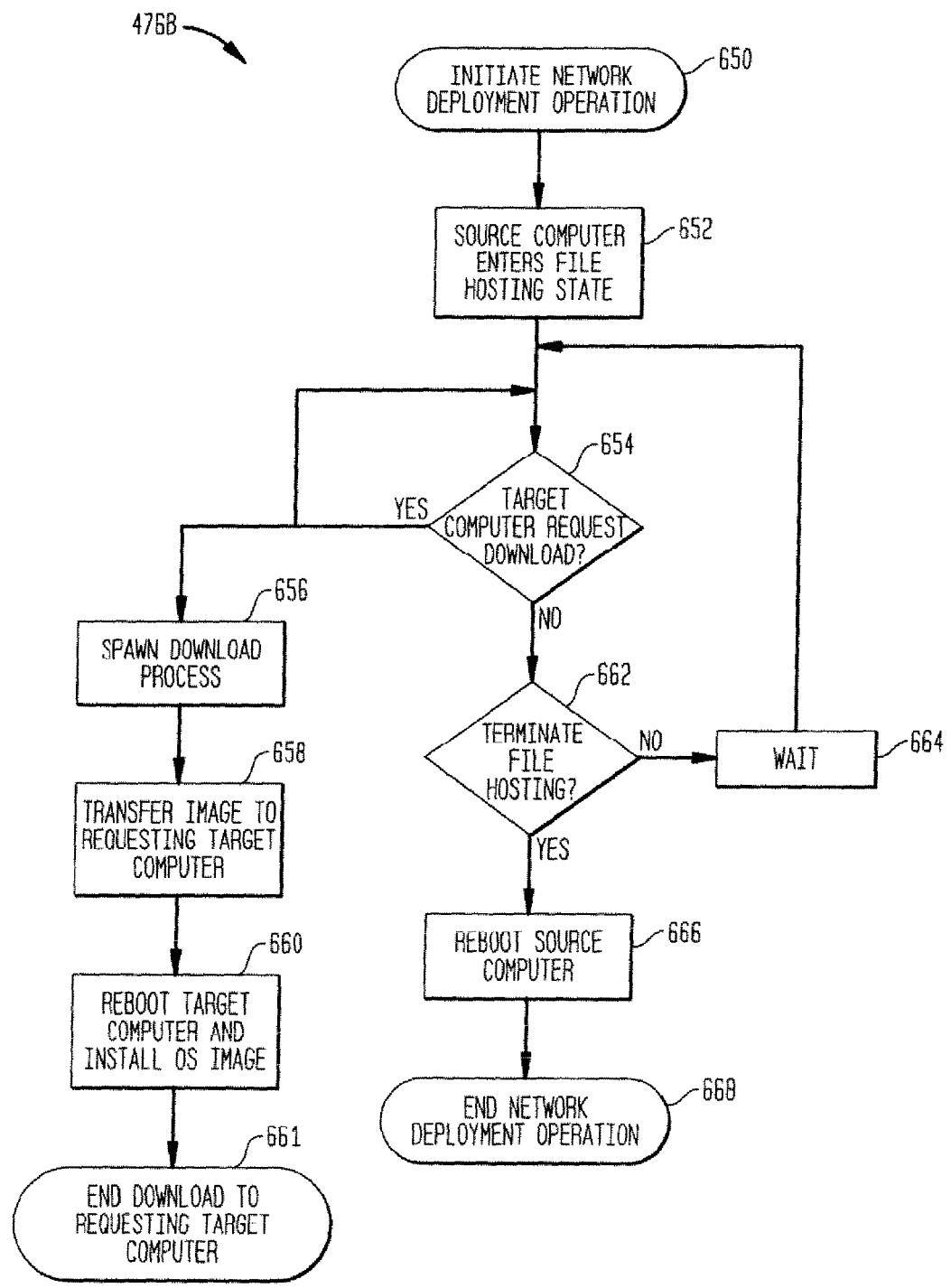

CAPTURING AND DEPLOYING AN OPERATION SYSTEM IN A COMPUTER ENVIRONMENT

CROSS-REFERENCE TO RELATED APPLICATIONS

This application is a continuation of copending U.S. patent application Ser. No. 11/790,672, which claims priority to U.S. Provisional Patent Application No. 60/897,779, filed Jan. 25, 2007, which is hereby incorporated by reference herein.

BACKGROUND

Field of the Invention

The present invention relates generally to computing devices, and more particularly, to capturing and deploying an operating system in a computing environment.

Related Art

As technology has become integrated with the workplace, corporations and other enterprises have developed a need to create computing environments that supply the members of the enterprise with computers and related equipment. Commonly, enterprises attempt to standardize the configurations and/or systems of the computers within the computing environment. The primary rationale for such standardization is that it simplifies maintenance, support and/or management of the computers and related equipment. Computers utilized in a typical computing environment may include client computers, such as thin clients, fat clients, ultra-thin clients, or hybrid clients, etc., terminal computers, or other networked or non-networked computers now or later developed. Related systems may include peripheral equipment such as servers, printers, etc.

Standardization of computer configurations within a computing environment has traditionally occurred in several different manners. In one conventional technique, an information technology (IT) professional manually configures each computer within the environment. This technique may be both time consuming and costly for the enterprise.

A more common method is for an IT professional to manually configure a master or source computer. Such a configuration, often referred to as a master disk image, is thereafter used to configure other computers in the computing environment. In addition to ensuring the master or source computer is properly configured, the IT professional must then utilize complicated software, along with additional equipment peripheral to the master computer, such as servers and databases, to deploy the master disk image to other computers within the computing environment. This method may also be both costly and time consuming for the enterprise to obtain the complicated software necessary for the deployment, as well as to obtain and/or develop an IT professional qualified to utilize such hardware and software.

SUMMARY

In one aspect of the present invention, a method for copying an operating system of a source computer to at least one target computer for execution by the at least one target computer, is disclosed. The source computer comprises a first storage device in which the operating system is stored and a second storage device. The method comprises: storing on the first storage device a file corresponding to, and containing one or more settings of, the operating system; copying from the first storage device to the second storage device the corresponding file and an image of the operating system; and deploying from the second storage device of the source computer to the at least one target computer the operating system image and the corresponding file.

BRIEF DESCRIPTION OF THE DRAWINGS

Embodiments of the present invention will be described in conjunction with the accompanying drawings, in which:

FIG. 4 is a high level flowchart illustrating the general aspects of a device state capture-deployment operation in accordance with embodiments of the present invention;

FIG. 5 is a flowchart illustrating the operations performed during embodiments of a copy operation shown in FIG. 4;

FIG. 6A is a flowchart illustrating the operations performed during one embodiment of a deployment operation shown in FIG. 4; and FIG. 6B is a flowchart illustrating the operations performed during another embodiment of the deployment operation shown in FIG. 4.

DETAILED DESCRIPTION

Aspects of the present invention are generally directed to capturing an image of an operating system of a computing device, and deploying the captured image to one or more other computing devices in a computing environment. Such computing devices may include client computers, such as thin clients, fat clients, ultra-thin clients, or hybrid clients, etc., terminal computers, or other networked or non-networked computers now or later developed. This capturing and deployment facilitates the replication of the configuration of source computer without reliance on sophisticated software or additional hardware or software such as servers and the like.

Specifically, embodiments of the present invention provide a user of a computing device with the ability to capture the operating system of a first computing device on which the operating system has been installed for execution, (referred to herein as a source computer). In performing the capture process, the source computer creates and stores a file that corresponds with, and contains one or more settings of, the operating system. The source computer generates an image of the operating system of the source computer, and copies the image of the operating system and the corresponding settings file to a storage device on the source computer, such as, for example, a USB flash memory, internal Random Access Memory (RAM), etc. The copy of the operating system image and the copy of the corresponding settings file may then be deployed to one or more other computing devices, referred to herein as target computers. The target computer(s) is/are loaded with the image of the operating system and the corresponding settings file. Thereafter, the target computer(s) may boot with the loaded operating system utilizing the operating system settings contained in the corresponding settings file to attain a configuration that emulates the configuration of the source computer.

Exemplary embodiments of the present invention are described herein in the context of terminal computing devices. In particular, embodiments of the present invention will be described with reference to a particular type of terminal computing devices, referred as "thin clients." As used herein, the term "thin clients" refers to a terminal computing device that cooperates with one or more servers to access programs or information stored on the servers. Thin clients provide a user with access to various programs and information without requiring large amounts of processing or memory at the terminal computer. Although embodiments of the present invention are described herein in the context of thin clients, it should be appreciated by one of ordinary skill in the art that the same or alternative embodiments may be implemented in connection with any computing devices now or later developed.

Figure 1:
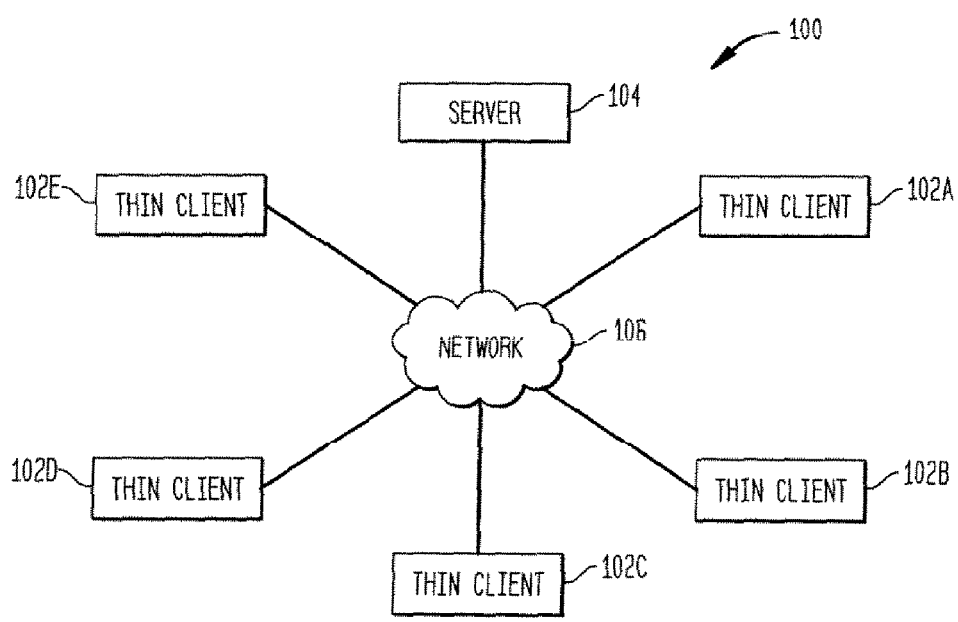
FIG. 1 is a schematic view of an exemplary computing environment in which embodiments of the present invention may be implemented.

FIG. 1 illustrates an exemplary computing environment 100 in which embodiments of the present invention may be implemented. As shown in FIG. 1, computing environment 100 comprises a plurality of terminal computers in the form of thin clients 102A-102E. Thin clients 102 communicate with a server 104 via a network 106. Network 106 may be any type of computer network now known or later developed, such as internet, intranet, a local-area network (LAN), a wide-area network (WAN), etc. Network 106 provides a communication network connection between each thin client 102 and server 104. In other embodiments, network 106 may provide a wireless connection between the computing devices. For example, thin clients 102 or server 104 may be remotely located from each other and connected via multiple interconnected networks. In one exemplary implementation of the embodiment of the present invention, a thin client 102 is configured as a source computer during a capture-deployment process, while other thin clients 102 are configured as target computers.

Figure 2:
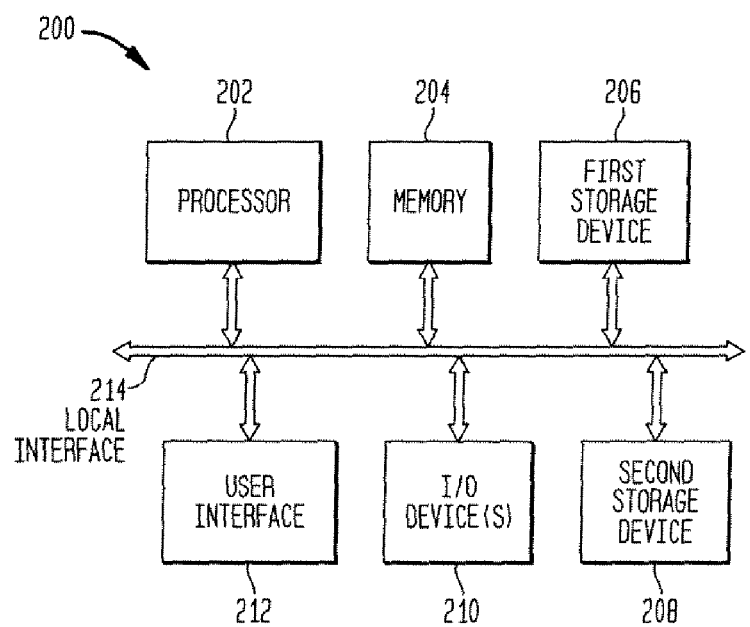
FIG. 2 is a block diagram of an embodiment of an exemplary computer in which embodiments of the present invention may be implemented.

FIG. 2 is an architectural block diagram of an embodiment of a thin client 102 in which embodiments of the present invention may be implemented, referred to herein as source computer 200. As illustrated, thin client 200 comprises a processor 202, a memory 204, a user interface 212, one or more input/output (I/O) devices 210, a first storage device 206 and a second storage device 208, each of which are communicably connected via local interface 214.

Processor 202 may comprise any custom-made or commercially-available processor, central processing unit (CPU), auxiliary processor, semiconductor-based microprocessor such as a microchip, etc. now known or later developed.

Memory 204 provides volatile data storage for thin client 200. In certain embodiments, memory 204 comprises, for example, random access memory (RAM), flash memory, magnetic RAM (MRAM), or any combination thereof. It should be appreciated, however, that memory 204 comprises any quantity or type of volatile memory now or later developed suitable for storing at least an operating system for execution on computing device 200.

User interface 212 may comprise one or more components with which a user, such as an IT professional or system administrator, may interact with thin client 200. For example, in some embodiments user interface 212 comprises a user monitor or display device, a keyboard, a mouse, etc. In alternative embodiments, user interface 202 may comprise user interface mechanisms now or later developed.

I/O device(s) 210 comprise(s) one or more components that establish a communication connection to other computing devices on network 100 (FIG. 1). For example, I/O devices 210 may comprise one or more serial, parallel, small system interface (SCSI), universal serial bus (USB), or IEEE 1394 connection elements. I/O device(s) 210 may further comprise, for example, components, such as a network card or modem that may be utilized by thin client 200 to communicate over network 100 (FIG. 1) with other thin clients or servers.

As noted, there are two storage devices included in this embodiment of computing device 200. A first storage device 206 provides for the storage of data in thin client 200. In accordance with embodiments of the present invention, first storage device 206 is a non-volatile storage device. First storage device 206 may comprise, for example, RAM, flash memory, MRAM, one or more hard drives (HD), floppy disks, optical discs, magneto-optical discs, holographic memory, etc., or any combinations thereof.

Second storage device 208 comprises one or more components for storing data in thin client 200. Second storage device 208 may comprise, for example, RAM, flash memory, MRAM, one or more hard drives (HD), floppy disks, optical discs, magneto-optical discs, holographic memory, etc, or any combinations thereof. In certain embodiments, second storage device 208 comprises one or more removable storage devices operationally connected to thin client 200. Examples of such an embodiment of second storage device 208 include a removable hard drive and a flash memory device integrated with a USB interface, commonly referred to as a USB flash drive.

In some embodiments, first storage device 206 and second storage device 208 may each comprise distinct storage elements, and may be housed separately. In other embodiments, first storage device 206 and second storage device 208 may comprise distinct memory elements of the same memory structure, and thus may be integrated in the same housing. In other embodiments, first and second memory devices 206, 208 each comprise a partitioned region of a single memory device.

Figure 3:
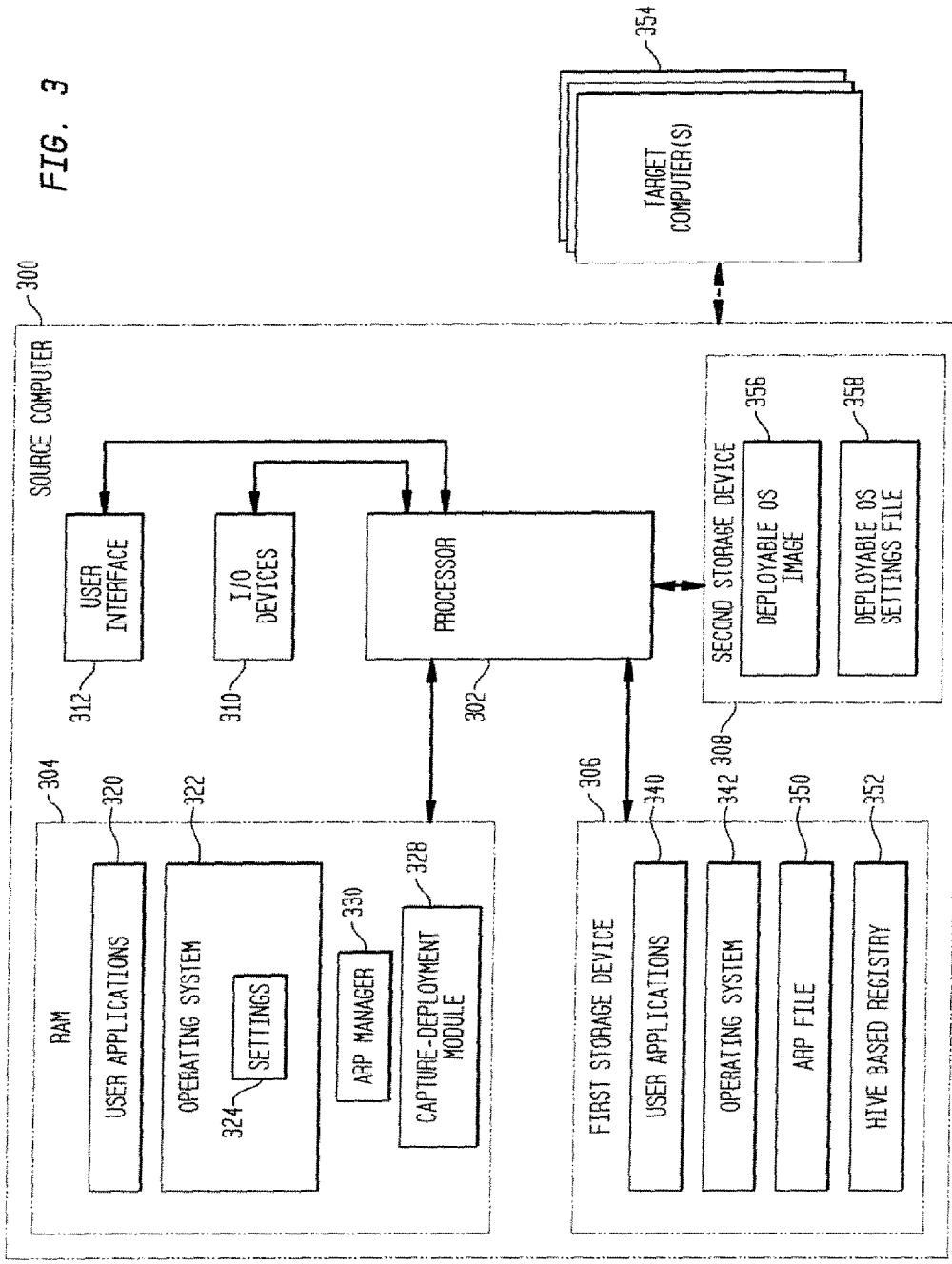
FIG. 3 is a functional block diagram illustrating the components of an exemplary source computer in accordance with embodiments of the present invention.

FIG. 3 is a functional block diagram of an exemplary source computer 300 communicably coupled with one or more target computers 354. In the context of the exemplary network illustrated in FIG. 1 and introduced above, source computer 300 and target computer(s) 354 are thin clients 102. It should be appreciated, however, that in other embodiments, source computer 300 and target computer 354 may be client computers, such as fat clients, ultra-thin clients, or a hybrid clients, etc., terminal computers, or any other networked or non-networked computers now known or later developed.

Source computer 300 comprises one or more software programs collectively referred to as capture-deployment module 328, which is configured to be executed on processor 302, to capture an image of an operating system installed on source computer 300, and to deploy this captured image to one or more target computers 354. Source computer 300 comprises a processor 302, a random access memory (RAM) device 304, a user interface 312, one or more I/O devices 310, a first storage device 306 and a second storage device 308. These components of source computer 300 may be the same or similar to the analogous components described above with reference to FIG. 2.

In the illustrative embodiment, RAM 304 has stored therein an operating system 322, user applications 320 and an embodiment of a capture-deployment module of the present invention. Operating system 322 is configured to control the execution of other programs on source computer 300, and to provide, for example, scheduling, I/O control, file and data management, memory management, communication control, etc. When executing, operating system 322 references settings 324 that may comprise various settings that at least partially define the configuration of source computer 300, commonly referred to as registry settings. As will be described in further detail below, processor 302 is configured to execute operating system 322 stored in RAM 304 without having to access a local boot drive.

User applications 320 may comprise programs that operate in conjunction with operating system 322, such as a network browser program, a remote access program, a media player program, or any other programs desired by a user. Such programs temporarily reside in RAM 304 for execution by processor 302.

Capture-deployment module 328, as noted, resides in RAM 304 and is executed by processor 302 to perform the capture-deployment operations described in detail below. Capture-deployment module 328 may utilize an Adaptive Registry Proliferation (ARP) manager 330 to create a modified version of a registry file of operating system 322. This modified version of the registry file, referred to as an ARP file, may be a textual representation of the registry settings, along with other embedded metadata. In one embodiment, ARP file 350 is used to identify which settings are unique to source computer 300. ARP file 350 is utilized to ensure a target computer 354 receiving an image of the operating system of source computer 300 does not also receive the source computer's unique information, such as, for example, the IP address, asset tag numbers, encryption keys, etc. of source computer 300. An acceptable exemplary ARP manager and ARP file are described in greater detail in commonly owned and co-pending U.S. patent application Ser. No. 10/971,622, which is hereby incorporated by reference herein.

As illustrated, first storage device 306 of source computer 300 may comprise user applications 340, which may be a copy of user applications 320, and a copy of operating system 322, referred to as operating system 342, an ARP file 350 and a hive based registry 352. As would be appreciated by one of ordinary skill in the art, hive based registry 352 comprises the native binary system settings for operating system 342. It should be appreciated that operating system 342 may act as the file system from which processor 302 boots when, for example, source computer 300 is initially powered and loads operating system 322 into RAM 304.

In the embodiment illustrated in FIG. 3, a user may initiate a capture-deployment operation using user interface 312. Upon launching the capture-deployment operation, a graphical user interface (GUI) may be presented to the user via a display device to guide the user through the capture-deployment operation. As will be described further below, after initiation of the capture-deployment operation, capture-deployment module 328, utilizing ARP manager 330, creates ARP file 350 and stores the ARP file in first storage device 306. Capture-deployment module 328 then prepares first storage device 306, generates an image 356 of operating system 342 stored on first storage device 306, and stores operating system image 356 to second storage device 308. This image of the operating system is depicted in FIG. 3 as deployable OS image 356 in second storage device 354. Capture-deployment module 328 also copies ARP file 350 to second storage device 308. This file contains the operating system settings and depicted in FIG. 3 as deployable OS settings file 358. The image of operating system 342 and the corresponding ARP file 350 stored in second storage device 308 may then be deployed to one or more target computers 354. Details of an exemplary capture-deployment operation will now be described in more detail below with reference to FIGS. 4-6B.

FIG. 4 is a high level flowchart of an exemplary capture-deployment operation 400 in accordance with embodiments of the present invention. FIG. 4 is described next below with reference to the embodiment of source computer 300 described above with reference to FIG. 3. Capture-deployment operation 400 may be initiated on source computer 300 at block 470. As noted above, capture-deployment operation 400 may be initiated by a user via user interface 312.

At block 472, an ARP file 350 comprising settings of operating system 320 is created by processor 302 executing the programs of ARP manager 330 and stored on first storage device 306. As noted, ARP file 350 contains the registry settings of operating system 322 and may be stored as a text file. As noted, the details of at least one embodiment for creating an ARP file are described in commonly-owned U.S. patent application Ser. No. 10/971,622, incorporated by reference herein elsewhere in this application.

At block 474, a copy operation is performed to copy the image of operating system 342 and corresponding ARP file 350 to second storage device 308. As noted, this copy of the operating system image is referred to as deployable operating system image 356, while the copy of the ARP file is referred to herein as deployable OS settings file 358. An exemplary copy operation is described in more detail below with reference to FIG. 5.

At block 476, a deployment operation is performed to deploy the image of operating system 342 (image 356) and the corresponding ARP file 350 (file 358) stored on second storage device 308 to one or more target computers 354. An exemplary deployment operation is described in more detail below with reference to FIGS. 6A and 6B. Capture-deployment operation 400 then terminates at block 478.

FIG. 5 is a flowchart of an exemplary embodiment of the copy operation described above with reference to block 474 (FIG. 4). Copy operation 474 is initiated at block 580. At block 582, capture-deployment module 328 dismounts operating system 342 from operating system 322 executing in RAM 304. Dismounting operating systems 322 and 342 isolates the operating systems 322, 342 and allows operating system 322 to continue to run entirely in RAM 304, without having to access a local boot drive. In other words, after dismount, operating system 322 does not need to access operating system 342 in first storage device 306 to remain active. As a result, operating system 322 remains active and stable, but completely executing in RAM 304. Further, after dismount, operating system 322 may be prevented from writing to first storage device 306. As such, due to the exemplary dismount operation, first storage device 306 will contain a stable, unchanging version of operating system 342 that is not accessed, or written to, by operating system 322.

At block 584, selected registry settings stored on first storage device 306 may be deleted by capture-deployment module 328 from first storage device 306 using, for example, computer name or static IP address. In one embodiment, the selected registry settings deleted from first storage device 306 are the settings stored in hive based registry 352. As noted above, hive based registry 352 contains the native binary system settings files for operating system 342. The selected registry settings may be deleted from first storage device 306 because, as noted above, ARP file 350 may store the desired system settings. Further, the selected registry settings may be removed to help avoid potential problems due to, for example, the combination of ARP file 350 and other system settings potentially resulting in a conflict during the deployment operation. An embodiment of the deployment operation will be discussed in further detail below with reference to FIGS. 6A and 6B.

At block 586, the image of operating system 342 and ARP file 350 are copied to second storage device 308. As would be appreciated, the image of operating system 342 and the corresponding ARP file 350 may be copied from first storage device 306 to second storage device 308 in any manner now know or later developed. For example, in one embodiment, capture-deployment module 328, executing on processor 302, may use sector-by-sector copying operations to copy all portions of first storage device 306 to second storage device 308. Following such a copy operation, second storage device 308 comprises an image of first storage device 306.

In other embodiments, a file-by-file copy operation may be employed. In such embodiments, each file or group of files in connection with the image of operating system 342 and ARP file 352 are copied to second storage device 308. For example, in one embodiment, capture-deployment module 328, executing on processor 302, copies the image of operating system 342 and ARP file 350, one or more files at a time, until the entire image of operating system 342 and ARP file 350 are copied to second storage device 308. It should be appreciated that files other than those containing operating system 342 and ARP file 350 may also be copied during copy operation 474.

At block 590, the selected registry settings that were deleted at block 584 are restored to first storage device 306. Copy operation 474 then terminates at block 592.

FIG. 6A is a flowchart of an exemplary deployment operation 476A for deployment of operating system image 356 and corresponding OS settings file 358, in accordance with an embodiment of the present invention. Deployment operation 476A may, for example, be implemented during deployment operation 476 (FIG. 4). Further, in this exemplary embodiment, second storage device 308 comprises a removable storage device, such as, for example, a USB flash memory, operationally connected to source computer 300.

Deployment operation 476A is initiated at block 630. At block 632, second storage device 308 may be disconnected (i.e., operationally removed) from source computer 300. At block 634, second storage device 308 is connected to a target computer 354. In this example in which second storage device 308 is a USB flash drive, at block 634 the USB flash drive is disconnected from source computer 300 and connected to target computer 354 via a USB interface on target computer 354.

At block 636, target computer 354 with second storage device 308 connected thereto, is rebooted. Target computer 354 may then boot from the operating system image 356 stored on second storage device 308. As target computer 354 reboots from operating system image 356, this operating system replaces the operating system previously stored on target computer 354. Operating system 356 then copies the corresponding OS settings file 358 (that is, a copy of ARP file 350) into volatile or non-volatile memory on target computer 354. As such, following reboot, target computer 354 has a configuration that emulates that of source computer 300.

After target computer 354 reboots and obtains the desired configuration, a determination may be made at block 638 as to the image of operating system 342 is to be deployed to additional target computers 354. If the image of operating system 342 is to be deployed to more target computers 354, deployment operation 476A returns to block 632 and repeats the above operations of blocks 632, 634, 636 and 638 until the image of operating system 342 has been deployed to desired number of target computers 354. After which, deployment operation 476A terminates at block 640.

FIG. 6B is a flowchart of an exemplary deployment operation 476B for distributing the operating system 342 over a network, in accordance with an embodiment of the present invention. Network deployment operation 476B may be implemented during, for example, deployment operation 476 (FIG. 4). In the following description of FIG. 6B, second storage device 308 comprises internal storage within source computer 300, such as a hard drive or flash memory.

Network deployment operation 476B is initiated at block 650. At block 652, source computer 300 may enter a file hosting state in which source computer 300 is configured as a file hosting service. For example, source computer 300 may enter a file hosting state allowing file transfer protocol (FTP) access.

After entering the file hosting state, at block 654, capture-deployment module 328, executing on processor 302, determines whether a target computer 354 has requested a download of the image 356 of operating system 342 stored in second storage device 308. In one embodiment, a download request may be received from a target computer 354 when a user desires to replace the operating system of target computer 354 with the operating system of source computer 300. In such an embodiment, a user may initiate a download request by launching a program on target computer 354. When the user initiates such a program at target computer 354, target computer 354 sends a signal to source computer 300 indicating that a download is desired. If a request has not been received, the network deployment operation 476B continues to block 662.

At block 662 a determination is made as to whether the user desires to terminate the file hosting service. If the user has not decided to terminate the file hosting service, network deployment operation 476B continues to block 664 where source computer 300 waits until either a target computer 354 requests a download at block 654, or a determination is made at block 662 that the file hosting service should be terminated.

Returning to block 654, if network deployment operation 476B determines that a target computer 354 has requested a download of operating system image 356 stored in second storage device 308, network deployment operation 476B continues to block 656. At block 656, network deployment operation 476B spawns. In other words, at block 656, network deployment operation 476B continues to satisfy the above noted download request, but network deployment operation 476B also begins to search for additional download requests. This spawning operation occurs each time network deployment operation 476B receives a download request.

As a result of each spawning operation performed at block 656, network deployment operation 476B splits into two branches to permit source computer 300 to handle multiple simultaneous download requests. A first branch (blocks 658, 660, and 661) continues to satisfy the download request of target computer 354, while a second branch immediately returns to block 654 to check for additional download requests. This may be performed by for example, repeating the described steps (blocks 654, 662 and 664) until another download is requested at block 654, or until the user desires to terminate file hosting at block 662.

Returning to the first branch, at block 658, network deployment operation 476B transfers the image of operating system 342 and ARP file 350 stored on second storage device 308 to requesting target 354. This transfer may occur directly from source computer 300 to target computer 354 via a physical or wireless connection. For example, the transfer may occur via internet, intranet, FTP, a local-area network (LAN), wide-area network (WAN), any combination thereof, etc. At block 660, the transferred image of operating system 342 and the copy of ARP file 350 may be stored in storage or memory of target computer 354. For example, in an embodiment, the transferred image of operating system 342 and copy of ARP file 350 are stored on flash memory or a hard drive of target computer 354. During the transfer, the operating system of target computer 354 continues to run, but the file system of the operating system of target computer 354 is replaced by the image of operating system 342 transferred to target computer 354. Following the transfer, a user reboots target computer 354. Because the image of operating system 342 has replaced the operating system previously stored on target computer 354, the target computer initializes and runs the image of operating system 342. During the reboot, the operating system 342 imports the registry settings stored in the transferred copy of ARP file 350 into the system settings of target computer 354 by, for example, utilizing scripts included in operating system 342. After which, target computer 354 will have a configuration that emulates that of source computer 300. At block 661, the download, and thus the first branch, may be terminated. Each time a new download is requested network deployment operation 476B branches as described above.

Returning to block 662, if network deployment operation 476B determines that the user desires to terminate the file hosting state, the operation continues to block 666. At block 666 network deployment operation 476B reboots the source computer. Network deployment operation 476B then terminates at block 668.

In embodiments of the present invention, capture-deployment operation 400 may be, for example, built into operating system 322 stored by source computer 300 and executed by processor 302. As such, in such embodiment, capture-deployment operation 400 would therefore be included in subsequent copies of operating system 322 (e.g., operating system 342).

In other embodiments, capture deployment operation 400 may be stored on a computer readable medium installable and removable from source computer 300, such as, for example, a magnetic (e.g., a floppy disk) or optical disk (e.g., CD, DVD, etc.) which may be inserted into a corresponding reader for source computer 300. In such embodiments, when the disk is inserted into source computer 300, a user may launch capture-deployment 400 from the disk.

As would be appreciated, capture deployment operation 400 may deploy in any manner now known or later developed, and the deployment operations described with reference to FIGS. 6A and 6B are provided for illustration, and should not be considered as limiting the scope of the present invention.

Although the present invention has been discussed in reference to the capture and deployment of an operating system of a source computer, it should be appreciated that other programs and files may also be captured and deployed along with the operating system. For example, it is within the scope of the invention to capture and deploy user applications (i.e. programs that operate in conjunction with the operating system, such as a network browser program, a remote access program, a media player program, etc.) along with the operating system. In such embodiments, the source computer would be configured to generate images of the user applications and other programs, and copy these images to the second storage device as described above. These images would then be deployed along with the image of the operating system and the copy of the ARP file in the same manner as described above.

Further features of the present invention may be described in U.S. Provisional Patent Application No. 60/897,779, filed Jan. 25, 2007, which is hereby incorporated by reference herein.

Although the present invention has been fully described in conjunction with several embodiments thereof with reference to the accompanying drawings, it is to be understood that various changes and modifications may be apparent to those skilled in the art. For example, it should be appreciated by one of ordinary skill in the elements described above with reference to functional block diagrams may comprise more or less components than those illustrated or described, and that the functional divisions described herein are conceptual only and are provided to facilitate understanding of embodiments of the present invention. Such functional allocations, therefore, should not be construed as limiting in any way. In addition, the embodiments of capture-deployment module are described above in the context of a software embodiment; that is, the capture-deployment module comprises software code that is executed by processor 102. It should be appreciated however, that the capture-deployment module may contain any quantity of separately-executable code modules that may be processed on the same or different processors, and that such a division may or may not coincide with the functional divisions described herein. Further, it should be understood that one or more operations performed by capture-deployment module may be performed by firmware, hardware, software or any combination thereof. Such changes and modifications are to be understood as included within the scope of the present invention as defined by the appended claims. The present embodiments are, therefore, to be considered in all respects as illustrative and not restrictive.

All documents, patents, journal articles and other materials cited in the present application are hereby incorporated by reference.

What is claimed is:

1. A method for copying an operating system of a source computer to at least one target computer for execution by the at least one target computer, the source computer comprising a first storage device in which the operating system is stored and a second storage device, the method comprising:
    storing on the first storage device a file corresponding to and containing one or more registry settings of the operating system;
    deleting hive based registry settings from the file to generate a deployable settings file;
    copying from the first storage device to the second storage device an image of the operating system and the deployable settings file by copying, sector-by-sector, from the first storage device to the second storage device all portions of the first storage device to the second storage device; and
    deploying from the second storage device of the source computer to the at least one target computer the operating system image and the deployable settings file, wherein deploying comprises:
    configuring the source computer as a file hosting service;
    receiving from the at least one target computer a request to download the operating system;
    transferring to the at least one target computer the image of the operating system and the deployable settings file, wherein the at least one target computer is to boot with the image of the operating system using the deployable settings file to attain a configuration that emulates the configuration of the source computer; and spawning an operation to search for additional download requests while another operation continues transferring to the at least one target computer.

2. The method of claim 1, wherein the operating system stored in the first storage device is a copy of an operating system stored in a volatile memory of the source computer.

3. The method of claim 1, wherein the second storage device comprises a random access memory.

4. The method of claim 1, wherein the second storage device comprises a removable storage device attached to the source computer.

5. The method of claim 1, wherein the file corresponding to and containing one or more registry settings of the operating system is a text file containing the registry settings of the operating system.

6. A non-transitory computer readable medium storing computer-executable instructions for use in copying an operating system of a source computer to at least one target computer, the source computer comprising a first storage device in which the operating system is stored and a second storage device, the instructions performing:

storing in the first storage device a file corresponding to and containing one or more registry settings of the operating system;
deleting hive based registry settings from the file to generate a deployable settings file;
copying from the first storage device to the second storage device an image of the operating system and the deployable settings file by copying, sector-by-sector, from the first storage device to the second storage device all portions of the first storage device to the second storage device; and
deploying from the second storage device of the source computer to the at least one target computer the operating system image and the deployable settings file, wherein deploying comprises:
configuring the source computer as a file hosting service;
receiving from the at least one target computer a request to download the operating system;
transferring to the at least one target computer the image of the operating system and the deployable settings file, wherein the at least one target computer is to boot with the image of the operating system using the deployable settings file to attain a configuration that emulates the configuration of the source computer; and
spawning an operation to search for additional download requests while another operation continues transferring to the at least one target computer.

7. The non-transitory computer readable medium of claim 6, wherein the operating system stored in the first storage device is a copy of an operating system stored in a volatile memory of the source computer.

8. The non-transitory computer readable medium of claim 6, wherein the second storage device comprises: a random access memory.

9. The non-transitory computer readable medium of claim 6, wherein the second storage device comprises a removable storage device attached to the source computer.

10. The non-transitory computer readable medium of claim 6, wherein storing in the first storage device the corresponding file containing one or more registry settings of the operating system comprises:

creating a text file containing the registry settings of the operating system; and
storing the text file in the first storage device.

11. A system for copying an operating system of a source computer to at least one target computer for execution by the at least one target computer, the system comprising:

a first storage device on the source computer in which the operating system is stored;
a second storage device on the source computer; and
a processor configured to:
store in the first storage device a file corresponding to, and containing one or more registry settings of, the operating system;
delete hive based registry settings from the file to generate a deployable settings file;
copy from the first storage device to the second storage device an image of the operating system and the deployable settings file by copying, sector-by-sector, from the first storage device to the second storage device all portions of the first storage device to the second storage device; and
deploy to the at least one target computer the operating system image and the deployable settings file, wherein deploying comprises:
configuring the source computer as a file hosting service;
receiving from the at least one target computer a request to download the operating system;
transferring to the at least one target computer the image of the operating system and the deployable settings file, wherein the at least one target computer is to boot with the image of the operating system using the deployable settings file to attain a configuration that emulates the configuration of the source computer; and
spawning an operation to search for additional download requests while another operation continues transferring to the at least one target computer.

12. The system of claim 11, wherein the operating system stored in the first storage device is a copy of an operating system stored in a volatile memory of the source computer.

13. The system of claim 11, wherein the file containing one or more registry settings of the operating system comprises a text file containing the registry settings of the operating system.

* * * * *